(12) United States Patent
Motojima et al.

(10) Patent No.: US 8,118,327 B2
(45) Date of Patent: Feb. 21, 2012

(54) STRUCTURE OF STEERING SUPPORT PORTION

(75) Inventors: Teruhisa Motojima, Saitama (JP); You Matsutani, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 378 days.

(21) Appl. No.: 12/448,945

(22) PCT Filed: Jan. 18, 2008

(86) PCT No.: PCT/JP2008/050604
§ 371 (c)(1),
(2), (4) Date: Jul. 16, 2009

(87) PCT Pub. No.: WO2008/090817
PCT Pub. Date: Jul. 31, 2008

(65) Prior Publication Data
US 2010/0059977 A1 Mar. 11, 2010

(30) Foreign Application Priority Data
Jan. 24, 2007 (JP) .................................. 2007-014308

(51) Int. Cl.
*B62D 1/18* (2006.01)
(52) U.S. Cl. ...................................... 280/775; 280/779
(58) Field of Classification Search .................. 280/779, 280/775
See application file for complete search history.

(56) References Cited

U.S. PATENT DOCUMENTS

| 4,362,319 A * | 12/1982 | Masaki et al. ................ 280/779 |
| 4,821,837 A * | 4/1989 | Fifer ............................. 180/334 |
| 5,035,446 A * | 7/1991 | Arvidsson ..................... 280/775 |
| 5,052,240 A * | 10/1991 | Miyoshi et al. ................ 74/493 |
| 5,605,073 A * | 2/1997 | Milton et al. .................... 74/492 |
| 6,068,295 A * | 5/2000 | Skabrond et al. ............. 280/775 |
| 6,450,533 B1 * | 9/2002 | Kimura et al. ................ 280/779 |
| 6,644,690 B2 * | 11/2003 | Brownlee et al. ............. 280/779 |
| 6,648,402 B2 * | 11/2003 | Scheib et al. ............ 296/203.02 |

(Continued)

FOREIGN PATENT DOCUMENTS
JP 63-49587 3/1988
(Continued)

OTHER PUBLICATIONS
International Search Report issued Apr. 8, 2008 in the International (PCT) Application of which the present application is the U.S. National Stage.

*Primary Examiner* — Paul N Dickson
*Assistant Examiner* — Nicole Verley
(74) *Attorney, Agent, or Firm* — Wenderoth, Lind & Ponack, L.L.P.

(57) ABSTRACT

A structure of a steering support portion includes a steering support member (40), which is positioned within an instrument panel, a pair of front and back column brackets (22, 23), which are attached upon the lower portion of the steering support member (40), and a steering column (24), which is anchored, at two front and back locations, in a suspension support state, respectively, at front and back fastening points (25, 26) that are provided respectively upon the front and back column brackets (22, 23), wherein the steering support member (40) further has a shape of a triangular cross-section, which in turn further includes a horizontal upper surface portion (41), a forward facing incline surface portion (42), and a rear facing incline surface portion (43).

6 Claims, 4 Drawing Sheets

U.S. PATENT DOCUMENTS

| | | | |
|---|---|---|---|
| 6,923,086 B2 * | 8/2005 | Muller | 74/493 |
| 7,066,492 B2 * | 6/2006 | Horita | 280/777 |
| 7,320,290 B2 * | 1/2008 | Watanabe | 114/144 R |
| 7,374,232 B2 * | 5/2008 | Ellison et al. | 296/193.02 |
| 7,516,986 B2 * | 4/2009 | Kokubo | 280/779 |
| 7,669,688 B2 * | 3/2010 | Yamaguchi et al. | 180/312 |
| 7,695,016 B2 * | 4/2010 | Gogate | 280/777 |
| 2001/0035642 A1 * | 11/2001 | Gotz et al. | 280/779 |
| 2002/0121771 A1 * | 9/2002 | Shifflett et al. | 280/779 |
| 2002/0140219 A1 * | 10/2002 | Tsunoda et al. | 280/779 |
| 2006/0119063 A1 * | 6/2006 | Bodin | 280/89 |
| 2006/0186658 A1 * | 8/2006 | Yasuhara et al. | 280/775 |
| 2007/0080531 A1 * | 4/2007 | Min | 280/777 |
| 2011/0121553 A1 * | 5/2011 | Battistella et al. | 280/779 |

FOREIGN PATENT DOCUMENTS

| | | |
|---|---|---|
| JP | 2004-224101 | 8/2004 |
| JP | 2005-231507 | 9/2005 |

* cited by examiner

STRUCTURE OF STEERING SUPPORT PORTION

TECHNICAL FIELD

The present invention relates to a structure of a steering support portion, which supports a steering column.

BACKGROUND ART

An instrument panel is installed upon a frontal portion of an interior of a passenger compartment within a vehicle, such as an automobile. A steering support member, which extends in approximately a direction of a width of the vehicle, and which is capable of connecting left and right panels of the vehicle, is positioned within the instrument panel. Front and back column brackets are attached upon a lower portion of the steering support member. A steering column, which extends in approximately a forward and backward direction of the vehicle and is positioned upon a lower portion of the steering support member, is thus anchored at front and back two locations thereof to front and back fastening points that are provided on the front and back column brackets, respectively, in a suspension support state.

Figure 7:
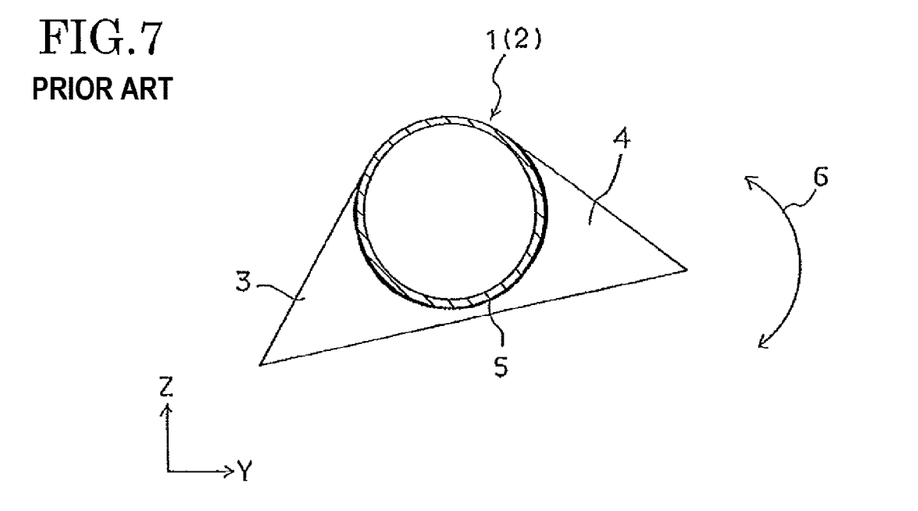
FIG. 7 is a side view of a conventional structure of a steering support portion.

Here, such a steering support member 1 is normally configured of a metallic cylindrical pipe 2, such as is depicted in FIG. 7. Whereas the column brackets 3 and 4 may comprise both an integrated configuration and a separated configuration, the column brackets 3 and 4 comprise the integrated configuration in the present circumstance. The steering support member 1 is fitted with a cylindrical receptacle surface that is formed by the integrated column brackets 3 and 4, and is further fixed in place thereupon by a weld portion 5. The weld portion 5 is provided along the cylindrical receptacle surface.

In the circumstance wherein the steering support member 1 is structured by the metallic cylindrical pipe 2, however, the configuration thereof is structurally weakened with respect to a twisting motion 6, thereby giving rise to a trend wherein a rigidity with respect to a vertical oscillation of the steering column may prove insufficient as a result, and a problem thus results in that a necessity arises for increasing a diameter or a thickness of the cylindrical pipe 2 as a countermeasure against the insufficient rigidity thereof.

As a consequence thereof, a proposal has been put forth for such as forming the steering support member 1 into a variant cross-section other than a cross-section of the cylindrical pipe 2, i.e., other than a circular cross-section; refer, as an instance thereof, to Japanese Patent Application Laid Open No. S63-49587 for particulars.

Figure 8:
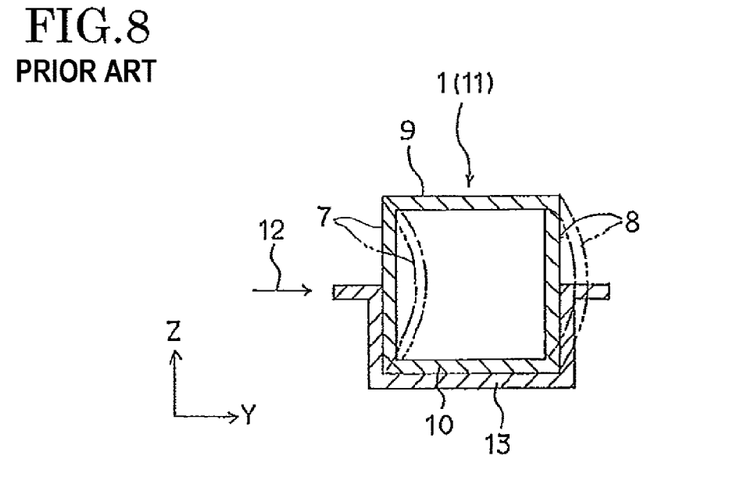
FIG. 8 is a side view of a conventional structure of a steering support portion having a variant cross-section.

As an instance thereof, the steering support member 1 is configured to include a rectangular pipe 11 having a square cross-section wherein each of surfaces 7 to 10 of the steering support member faces front and back, up and down, respectively, as is depicted in FIG. 8.

DISCLOSURE OF THE INVENTION

Problems the Invention is Intended to Solve

If the steering support member 1 is configured to include the rectangular pipe 11 having the square cross-section, as depicted in FIG. 8, however, the steering support member 1 that results therefrom will be weakened with respect to an applied load 12 being imparted thereupon, or, put another way, the front and back surfaces 7 and 8 thereof will be prone to deformation with respect to the applied load 12 being imparted thereupon, such as is depicted by a conceptual line depicted in FIG. 8. A necessity thus arises for employing a countermeasure against the deformation described herein, such as installing such as a reinforcing bracket 13 upon an underside of the steering support member 1 including the square cross-section, giving rise to a problem of incurring an increase in a weight or a cost thereby.

An object of the present invention is to provide a structure of a steering support portion that presumes a structure that is resilient with respect to an applied weight being imparted thereupon from a frontal surface of a vehicle chassis, as well as comprising a high degree of rigidity with respect to a vertical oscillation of a steering column thereupon.

Means to Solve the Problems

In order to achieve the above object, a structure of a steering support portion according to an embodiment of the present invention includes a steering support member, which is installed within an instrument panel, extending in approximately a direction of a width of a vehicle, and which is capable of connecting right and left panels of the vehicle, front and back column brackets, which are attached upon a lower portion of the steering support member, and a steering column, which extends in approximately a front and back direction of the vehicle and is positioned upon the lower portion of the steering support member.

Two front and back locations of the steering column are attached, in a suspension support state, respectively, at front and back fastening points that are installed respectively upon the front and back column brackets. The steering support member includes an approximately triangular cross-section surface, which further includes a horizontal upper surface portion upon an upper surface thereof, which is approximately parallel with both a lengthwise (front and back) direction and a width direction of the vehicle, a frontal incline surface portion upon a lower portion of the horizontal upper surface portion thereof, whereupon the column bracket of the front part is attached, and a rear incline surface portion upon the lower portion of the horizontal upper surface portion thereof, whereupon the column bracket of the back part is attached.

BEST MODE FOR CARRYING OUT THE INVENTION

A description of specific embodiments for carrying out the present invention will be described in detail hereinafter, with reference to the attached drawings.

Embodiments

FIG. 1 to FIG. 6 illustrate a structure of a steering support portion according to one embodiment of the present invention.

A constitution of the structure of the steering support portion is first described.

Figure 1:
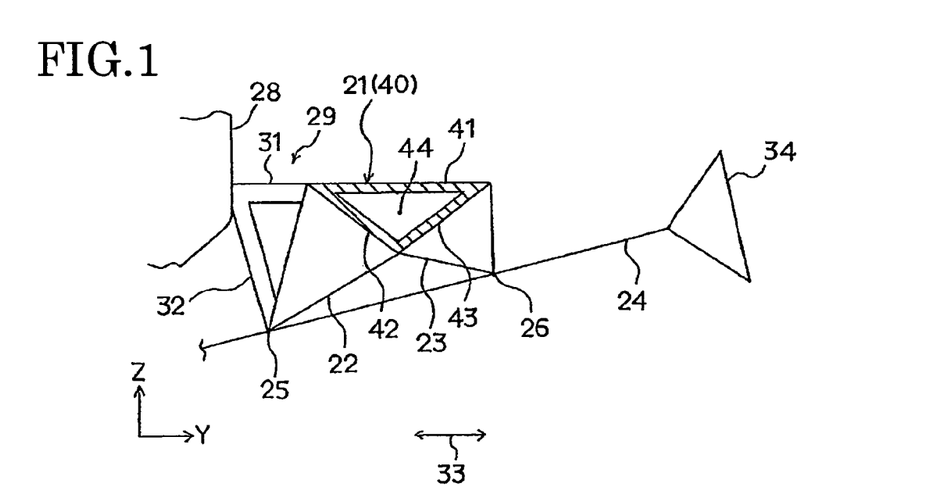
FIG. 1 is a side view of a structure of a steering support portion according to an embodiment of the present invention.

An instrument panel is installed upon a front portion of an interior of a passenger compartment within a vehicle, such as an automobile. A steering support member 21, which extends in approximately a direction of a width of the vehicle, and which is capable of connecting right and left panels of a chassis of the vehicle, is positioned within the instrument panel, such as is depicted in FIG. 1. A pair of front and back column bracket 22 and 23 are attached upon a lower portion of the steering support member 21. Whereas the column brackets 22 and 23 may be used as an integrated configuration and a separated configuration, it is to be understood that the column brackets 22 and 23 are configured to have the separated configuration in the present circumstance.

In addition, a steering column 24 is positioned upon a lower portion of the steering support member 21. The steering column 24 extends in approximately a direction of a length of the vehicle 33. The steering column 24 is anchored, at two front and back locations to front and back fastening points 25 and 26 that are provided upon the front and back column brackets 22 and 23, respectively, in a suspension support state. The front and back column brackets 22 and 23 are partially attached upon a location that corresponds with the steering support member 21 upon the direction of the width of the vehicle, with respect to the steering support member 21. The pair of front and back column brackets 22 and 23 are provided to sandwich the steering column 24.

The steering column 24 is inclined toward a rear of the vehicle upwardly, and a steering wheel 34 is attached upon a rear end portion of the steering column 24. It is to be understood that the front and back column brackets 22 and 23 are collectively referred to as such as upper and lower column brackets 22 and 23, in accordance with the steering column 24 being inclined upward and toward the rear of the vehicle. In such a circumstance, the column bracket 22 upon the forward side comprises a column bracket 22 upon a lower side, and the column bracket 23 upon the rear side comprises a column bracket 23 upon an upper side. In the present circumstance, the front and back column brackets 22 and 23 will be referred to hereinafter as the fore and aft column brackets 22 and 23.

Conversely, a passenger compartment front panel 28, such as a dashboard, is installed upon a fore portion of the passenger compartment. The passenger compartment front panel 28 is a partition that isolates the passenger compartment from an engine compartment of the vehicle. A post bracket 29 is installed between the passenger compartment front panel 28 and either the steering support member 21 or the column bracket 22 upon the forward side. The post bracket 29 comprises a post bracket upper material 31 and a post bracket lower material 32. Normally, the post bracket upper material 31 and the post bracket lower material 32 are configured as an integrated object that is bent in approximately a chevron shape. The portion of the post bracket upper material 31 and the post bracket lower material 32 that is bent in the chevron shape is thus anchored upon the passenger compartment front panel 28, a free end, i.e. an back end, of a level portion of the chevron shape thereof is anchored either upon the steering support member 21 or upon an upper portion of the column bracket 22 upon the forward side, and a free end, i.e., a lower end, of an angled portion of the chevron shape thereof is anchored upon a lower portion of the column bracket 22 upon the forward side.

A material comprising a variant cross-section other than a circular cross section is employed as the steering support member 21.

According to the embodiment, with respect to a baseline configuration such as is described herein, the steering support member 21 includes an approximately triangular cross-section, i.e., a triangular steering support member, hereinafter referred to as a steering support member 40, further including a horizontal upper surface portion 41, which is approximately parallel to both the direction of the length of the vehicle 33 and the direction of the width of the vehicle, a forward facing incline surface portion 42, whereupon the column bracket 22 upon the forward side is attached, and a rear facing incline surface portion 43, whereupon the column bracket 23 upon the rear side is attached. In the present circumstance, the forward facing incline surface portion 42 is inclined upward and forward, and the rear facing incline surface portion 43 is inclined upward and to the rear.

In addition, it is presumed that the front and back column brackets 22 and 23 have an approximate triangular shape, in an elevation view thereof, in accordance with a presumption herein that the steering support member 40 has the triangular cross-section shape. In the present circumstance, the front and back fastening points 25 and 26 are respectively set upon a lower end portion of the front and back column brackets 22 and 23 of the approximately triangular shape in the elevation view.

Figure 2:
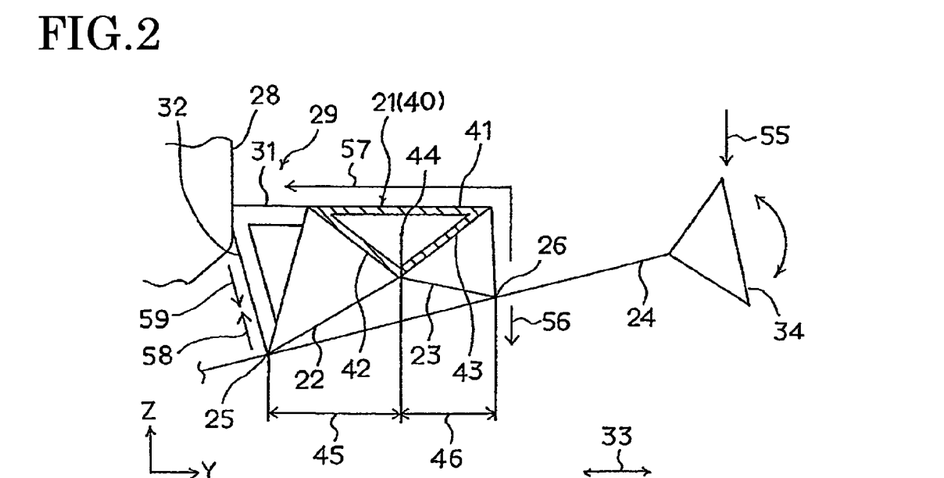
FIG. 2 is a side view showing a modified embodiment to FIG. 1.

As depicted in FIG. 2, a distance 45 of the direction of the length of the vehicle 33, from a fulcrum 44 of a twisting motion of the steering support member 40, which has the triangular cross-section shape, to the fastening point upon the forward side 25 of the column bracket 22 upon the forward side, is set so as to be longer than a distance 46 of the direction of the length of the vehicle 33, from the fulcrum 44 to the fastening point upon the rear side 26 of the column bracket 23 upon the rear side, i.e., such that the distance 45 is greater than the distance 46. The distance 45 is treated as being longer than a length that is recognized as being effectively equivalent to the distance 46, i.e., the distance 45 is configured to have a length of an order whereupon an effect of the invention is manifested. It would be particularly desirable for the distance 45 to be made as long as possible.

Figure 3:
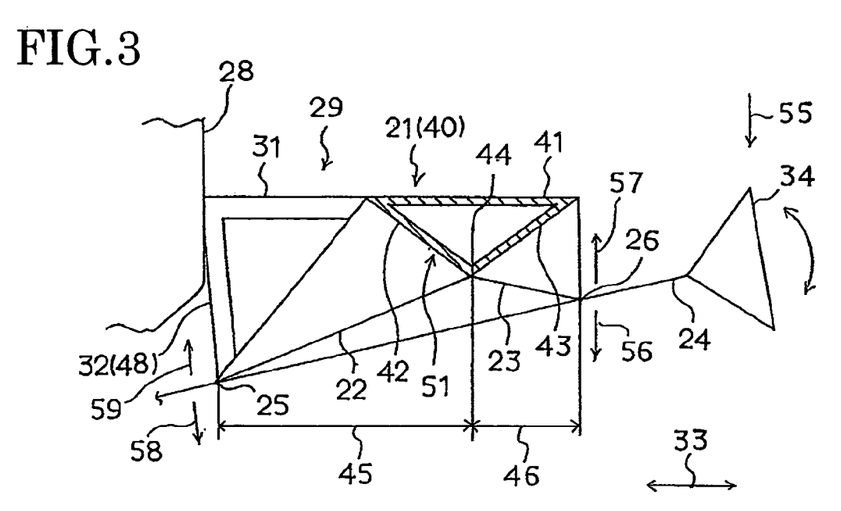
FIG. 3 is an elevation view showing another modified embodiment to FIG. 1.

Furthermore, as depicted in FIG. 3, the post bracket lower material 32 is set in an extended state in a direction that is approximately parallel to a tangent line, at the fastening point upon the forward side 25, of a circle, a center whereof is presumed to be the fulcrum 44 of the twisting motion of the steering support member 40, which has the triangular cross-section shape, i.e., the post bracket lower material 32 is a post bracket lower material in the direction of the tangent line, hereinafter referred to as a post bracket lower material 48. The post bracket lower material 48 is employed to link the column bracket 22 upon the forward side with the passenger compartment front panel 28. It is to be understood that it would be desirable for the post bracket lower material 48 to be coincident with the tangent line.

In the present circumstance, the post bracket upper material 31 is installed at a level, a height whereof is the same as the horizontal upper surface portion 41 with respect to the steering support member 40 that has the triangular cross-section shape, and is further installed so as to extend, in an approximately horizontal manner, in a sequence with the horizontal upper surface portion 41, in a forward direction along the direction of the length of the vehicle 33, so as to reach the passenger compartment front panel 28. The post bracket lower material 48 is thereupon installed upon a lower portion so as to extend thereupon, from a location of an end portion that corresponds to the passenger compartment front panel 28 of the post bracket upper material 31, such that the post bracket lower material 48 faces either in the tangent line direction described herein, or else in a direction parallel thereto, thereby reaching the steering column 24. Furthermore, the fastening point upon the forward side 25 of the column bracket 22 upon the forward side is set either upon a location of a lower end portion of the post bracket lower material 48, i.e., a location that reaches either the column bracket upon the forward side 22 or the steering column 24, or upon a near vicinity thereof.

As per each respective configuration described herein, the post bracket lower material 48 comprises a more upstanding form than the conventional mode thereof.

Figure 4:
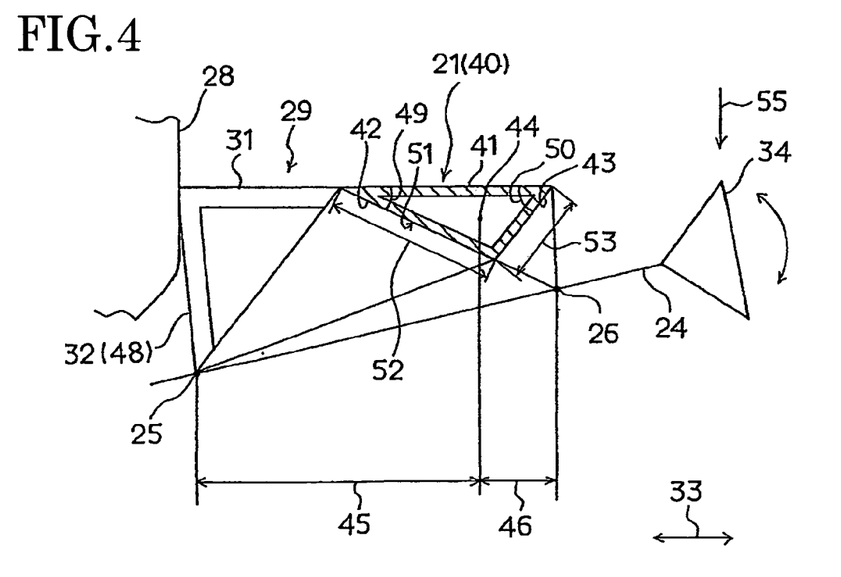
FIG. 4 is an elevation view showing still another modified embodiment to FIG. 1.

A totality of a region anchoring portion 51 is caused to be contact anchored upon a totality of a region of an incline surface length 52, which is provided between the column bracket 22 upon the forward side and the forward facing incline surface portion 42 of the steering support member 40, further including the triangular cross-section shape; refer to FIG. 4 for particulars.

As a consequence thereof, the three vertices of the column bracket 22, which comprises the approximately triangular shape in the elevation view, are set upon the fastening point upon the forward side 25 and both end portions of an incline surface length of the forward facing incline surface portion 42.

Furthermore, the incline surface length 52 of the forward facing incline surface portion 42 of the steering support member 40, having the triangular cross-section shape, is set so as to become greater than an incline surface length 53 of the rear facing incline surface portion 43, such as is depicted in FIG. 4.

As a consequence thereof, an angle 49, which is formed, with respect to the steering support member 40, further having the triangular cross-section shape, by the horizontal upper surface portion 41 and the forward facing incline surface portion 42 thereupon, is configured so as to be smaller than an angle 50, which is formed by the horizontal upper surface portion 41 and the rear facing incline surface portion 43 thereupon, i.e., such that the angle 49 is less than the angle 50. In particular, the angle 49 is set so as to have an acute angle, and the angle 50 is set so as to have an obtuse angle.

Following is a description of an effect according to the embodiment.

As an instance thereof, when a force 55 is applied, which is directed downward, upon the rearmost portion of the steering column 24, i.e., the steering wheel 34, such as is depicted in FIG. 2, a twisting motion, whereof the fulcrum of the twisting motion 44 is presumed to be a fulcrum thereupon, is imparted upon the steering support member 40. In such a circumstance, a force 56, which is directed in an approximately downward manner, is caused to act upon the fastening point upon the rear side 26. A countering force 57 of the force 56 is transmitted to the passenger compartment front panel 28 by way of the column bracket upon the rear side 23, the steering support member 40, and the post bracket upper material 31, whereupon the countering force 57 thus transmitted is imparted upon the passenger compartment front panel 28. At the same time, a force 58, which is directed in an approximately upward manner, is caused to act upon the fastening point upon the forward side 25. A countering force 59 of the force 58 is transmitted to the passenger compartment front panel 28 by way of the column bracket upon the forward side 22 and the post bracket lower material 32, whereupon the countering force 58 thus transmitted is imparted upon the passenger compartment front panel 28.

When the force 55 is applied, which is directed in the downward direction, upon the rearmost portion of the steering column 24, i.e., the steering wheel 34, it is to be understood that the result thereof is approximately similar to the preceding description, despite the direction of the force being reversed therefrom. Such an effect forestalls the vertical oscillation of the steering column 24.

According to the embodiment, the structure of the steering support portion includes the steering support member 40, which extends in approximately the direction of the width of the vehicle, and which is capable of forming the link between the left and the right panel of a chassis of the vehicle, and is positioned within the instrument panel, the front and back column brackets 22 and 23, which are attached upon the lower portion of the steering support member 40, and the steering column 24, which extends in approximately the direction of the length of the vehicle 33 and is positioned upon the lower portion of the steering support member 40, and is thus anchored, at two locations fore and aft thereupon, in the suspension support state, respectively, at the front and back fastening points 25 and 26 that are installed respectively upon the front and back column brackets 22 and 23, wherein the steering support member 40, further including the horizontal upper surface portion 41, which is approximately parallel to both the direction of the length of the vehicle 33 and the direction of the width of the vehicle, the forward facing incline surface portion 42, whereupon the column bracket 22 upon the forward side is attached, and the rear facing incline surface portion 43, whereupon the column bracket 23 upon the rear side is attached, is capable of obtaining an effect such as is described hereinafter, by being formed into the triangular cross-section shape thereupon.

Figure 5:
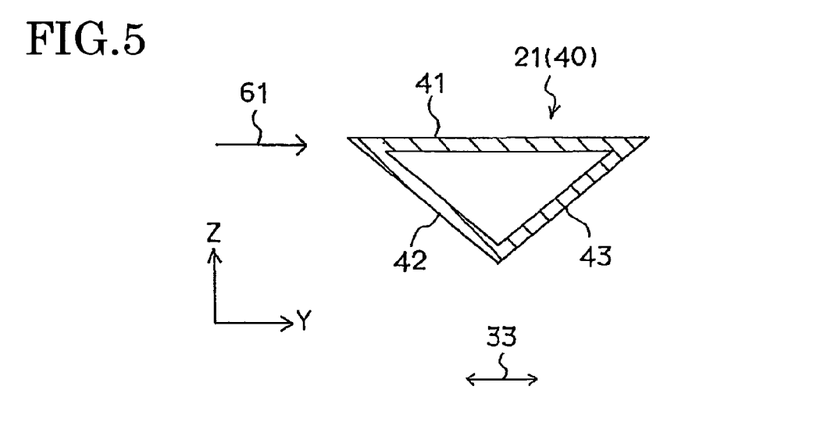
FIG. 5 is a reference diagram showing a resiliency of a steering support member having a triangular cross-section shape with respect to an applied load being imparted thereupon from a front surface of a vehicle chassis.

Put another way, by including the horizontal upper surface portion 41, which is approximately parallel to both the direction of the length of the vehicle 33 and the direction of the width of the vehicle, the steering support member 40, having the triangular cross-section shape, comprises a state wherein a fulcrum, or an axis, thereof passes through the direction of the length of the vehicle 33, thereby facilitating a structural resiliency with respect to an applied load 61 that is imparted thereupon from the frontal surface of the vehicle chassis; refer to FIG. 5 for particulars. Doing so obviates a necessity for such as reinforcing, creating a larger cross-section, or increasing a thickness of a material, with respect to the steering support member 40, and, as a consequence thereof, it becomes possible to reduce a manufacturing time, as well as a quantity of components or a weight, with regard to the steering support member 40, thus facilitating obtaining a reduction in a cost thereupon. In addition, further comprising the forward facing incline surface portion 42 and the rear facing incline surface portion 43 upon the underside of the horizontal upper surface portion 41 facilitates maintaining a surface area of the attachment with respect to the column bracket 22 upon the forward side and the column bracket 23 upon the rear side, and thereby effect an improvement in a rigidity thereupon.

In addition, setting the distance 45 of the direction of the length of the vehicle 33, from the fulcrum 44 of the twisting motion of the steering support member 40, which comprises the triangular cross-section shape, to the fastening point upon the forward side 25 of the column bracket 22 upon the forward side, so as to be longer than the distance 46 of the direction of the length of the vehicle 33, from the fulcrum 44 to the fastening point upon the rear side 26 of the column bracket 23 upon the rear side, i.e., such that the distance 45 is greater than the distance 46, facilitates obtaining an operational effect such as is described hereinafter.

Put another way, whereas, when the force 55 is applied upon the rearmost portion of the steering column 24, i.e., the steering wheel 34, the forces 56 and 58 that are caused to act upon the fastening point upon the forward side 25 and the fastening point upon the rearward side 26 includes a coupled force, a fulcrum whereof is presumed to include the fulcrum 44 of the twisting motion of the steering support member 40, an interval between the fastening point upon the forward side 25 and the fastening point upon the rearward side 26 becomes larger as a result of the setting thereof described herein, and it is thereby possible to presume a structure that is resilient with respect to the coupled force being imparted thereupon.

Figure 6:
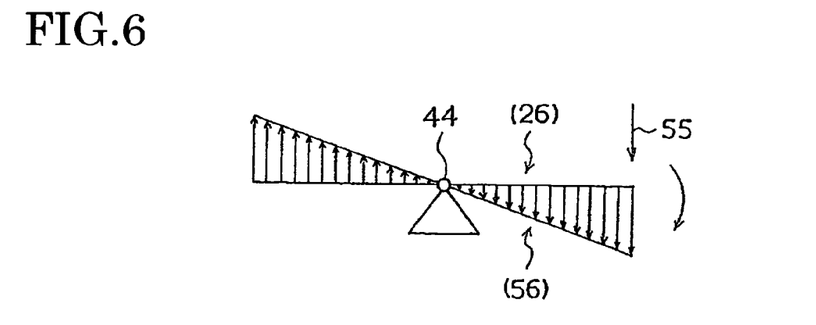
FIG. 6 is a reference diagram showing a size of a force that is imparted upon a back portion-fastening point in response to a distance from a fulcrum of a twisting motion.

Moreover, the location of the fastening point upon the rearward side 26 approaches the fulcrum 44 of the twisting motion by way of the setting described herein, and as a result, it is possible to presume that the force 56 that is imparted upon the fastening point upon the rearward side 26 comprises a comparatively small force, mechanically speaking; refer to FIG. 6 for particulars.

In addition, the location of the fastening point upon the forward side 25 approaches the forward portion of the vehicle, thereby facilitating an advantage thereupon by allowing the transmission of the force that is caused to act upon the fastening point upon the forward side 25 to the passenger compartment front panel 28 over a short path.

As a result of the factors described herein, it is possible to obtain a structure that comprises a high degree of rigidity with respect to the vertical oscillation of the steering column 24 thereupon.

Furthermore, in addition to forming a link between the column bracket 22 upon the forward side and the passenger compartment front panel 28 with the post bracket lower material 48, the post bracket lower material 48 is set in the extended state in the direction that is approximately parallel to the tangent line, at the fastening point upon the forward side 25, of the circle, the center whereof is presumed to be the fulcrum 44 of the twisting motion of the steering support member 40, which comprises the triangular cross-section shape, such as is depicted in FIG. 3, and, as a result thereof, it becomes possible to directly transmit the force 58 and the countering force 59 that is caused to act upon the fastening point upon the forward side 25 upon the passenger compartment front panel 28 by way of the post bracket lower material 48 that extends in the direction that is approximately parallel to the tangent line of the circle, without giving rise to an excess component force, and, as a consequence thereof, it is possible to efficiently keep the vertical oscillation of the steering column 24 under control.

In addition, given that the force that is generated upon the fastening point upon the forward side 25 is efficiently transmitted upon the passenger compartment front panel 28, and is thus imparted upon the passenger compartment front panel 28, it thus becomes possible to reduce the rigidity of such as the column bracket 22 or the post bracket lower material 48 by a commensurate amount, allowing effecting a reduction in a weight or a reduction in a cost thereof as a result.

The total region anchoring portion 51 is caused to be contact anchored upon the totality of the region of the incline surface length 52, which is comprised between the column bracket 22 upon the forward side and the forward facing incline surface portion 42 of the steering support member 40, further having the triangular cross-section shape, and, as a consequence thereof, it is possible to enlarge the surface area of the attachment of the column bracket 22 upon the forward side with respect to the forward facing incline surface portion 42, and thereby to improve a rigidity of a joint component of the column bracket 22 upon the forward side. Doing so obviates the necessity for reinforcing, with respect to the column bracket 22 upon the forward side, and, as a consequence thereof, it becomes possible to effect the reduction of the weight thereof, as well as the reduction in cost thereupon.

Furthermore, the incline surface length 52 of the forward facing incline surface portion 42 of the steering support member 40, further having the triangular cross-section shape, is set so as to become greater than the incline surface length 53 of the rear facing incline surface portion 43, such as is depicted in FIG. 4, and, as a consequence thereof, it is possible to further enlarge the surface area of the attachment of the column bracket 22 upon the forward side with respect to the forward facing incline surface portion 42, i.e., with respect to the totality of the region of the incline surface length 52 thereof, and thereby to improve the rigidity of the joint component of the column bracket upon the forward side 22. Doing so facilitates effecting the reduction of the weight thereof, as well as the reduction in cost thereupon, to further advantage.

EFFECTS OF THE INVENTION

As per the description provided herein, according to the present invention, a structure of a steering support portion includes a steering support member, which extends in approximately a direction of a width of the vehicle, which is capable of connecting right and left panels of a body of the vehicle, and which is positioned within the instrument panel, front and back column brackets, which are attached upon a lower portion of the steering support member, and a steering column, which extends in approximately a direction of a length of the vehicle and is positioned upon a lower portion of the steering support member, and which is thus anchored, at two front and back locations, in a suspension support state, respectively, at front and back fastening points that are installed respectively upon the front and back column brackets, wherein the steering support member comprises an approximately triangular cross-section surface, which is formed by further comprising a horizontal upper surface portion upon an upper surface thereof, which is approximately parallel with both a lengthwise direction and a width direction of the vehicle, a frontal incline surface portion upon a lower portion of the horizontal upper surface portion thereof, whereupon the column bracket of the fore part is attached, and a rear incline surface portion upon the lower portion of the horizontal upper surface portion thereof, whereupon the column bracket of the back part is attached. It is thereby possible to obtain an operating effect such as is described hereinafter.

Put another way, by comprising the horizontal upper surface portion, which is approximately parallel to both the direction of the length of the vehicle and the direction of the width of the vehicle, the steering support member, having the triangular cross-section shape, thereby facilitates a structural resiliency with respect to an applied load that is imparted thereupon from the frontal surface of the vehicle chassis. Doing so obviates a necessity for such as reinforcing, creating a larger cross-section, or increasing a thickness of a material, with respect to the steering support member, and, as a consequence thereof, it becomes possible to reduce a manufacturing time, as well as a quantity of components and a weight, with regard to the steering support member, thus facilitating obtaining a reduction in cost thereupon. In addition, further comprising the forward facing incline surface portion and the rear facing incline surface portion upon the underside of the horizontal upper surface portion facilitates maintaining a surface area of an attachment with respect to the column bracket upon the forward side and the column bracket upon the rear side, and thereby effecting an improvement in a rigidity thereupon.

In addition, a distance of the direction of the length of the vehicle, from a fulcrum of a twisting motion of the steering support member, which has the triangular cross-section shape, to the fastening point upon the forward side of the column bracket upon the forward side, is set so as to be longer than a distance of the direction of the length of the vehicle, from the fulcrum of the twisting motion to the fastening point upon the rear side of the column bracket upon the rear side, thereby allowing obtaining an operating effect such as is described hereinafter.

Put another way, whereas, when a force is applied upon the rearmost portion of the steering column, i.e., the steering wheel, the forces that are caused to act upon the fastening point upon the forward side and the fastening point upon the rearward side comprise a coupled force, a center whereof is presumed to comprise the fulcrum of the twisting motion of the steering support member, an interval between the fastening point upon the forward side and the fastening point upon the rearward side increases as a result of the setting thereof described herein, and it is thereby possible to presume a structure that is resilient with respect to the coupled force being imparted thereupon. Moreover, the location of the fastening point upon the rearward side approaches the fulcrum of the twisting motion by way of the setting described herein, and as a result, it is possible to presume that the force that is imparted upon the fastening point upon the rearward side comprises a comparatively small force, mechanically speaking. In addition, the location of the fastening point upon the forward side approaches the forward portion of the vehicle, as a result of the setting described herein, thereby facilitating an advantage thereupon by allowing transmitting the force that is caused to act upon the fastening point upon the forward side to the passenger compartment front panel over a short path. As a result of the factors described herein, it is possible to obtain a structure that comprises a high degree of rigidity with respect to the vertical oscillation of the steering column thereupon.

Furthermore, in addition to connecting the column bracket upon the forward side and the passenger compartment front panel with the post bracket lower material, the post bracket lower material is set in the extended state in the direction that is approximately parallel to the tangent line, at the fastening point upon the forward side, of the circle, the center whereof is presumed to be the fulcrum of the twisting motion of the steering support member, which comprises the triangular cross-section shape, and, as a result thereof, it becomes possible to directly transmit either the force, or the countering force, that is caused to act upon the fastening point upon the forward side upon the passenger compartment front panel by way of the post bracket lower material that extends in the direction that is approximately parallel to the tangent line of the circle, without giving rise to an excess component force, and, as a consequence thereof, it is possible to efficiently keep the vertical oscillation of the steering column under control. In addition, given that the force that is generated upon the fastening point upon the forward side is efficiently transmitted upon the passenger compartment front panel, and is thus imparted upon the passenger compartment front panel, it thus becomes possible to reduce the rigidity of such as the column bracket upon the forward side or the post bracket lower material by a commensurate amount, allowing effecting a reduction in a weight or a reduction in a cost thereof as a result.

In addition, a total region anchoring portion is caused to be contact anchored upon the totality of the region of the incline surface length, which is comprised between the column bracket upon the forward side and the forward facing incline surface portion of the steering support member, further comprising the triangular cross-section shape, and, as a consequence thereof, it is possible to enlarge the surface area of the attachment of the column bracket upon the forward side with respect to the forward facing incline surface portion, and thereby to improve the rigidity of a joint component of the column bracket upon the forward side. Doing so obviates the necessity for reinforcing, with respect to the column bracket upon the forward side, and, as a consequence thereof, it becomes possible to effect the reduction of the weight thereof, as well as the reduction in cost thereupon.

Furthermore, the incline surface length of the forward facing incline surface portion of the steering support member, further comprising the triangular cross-section shape, is set so as to become greater than the incline surface length of the rear facing incline surface portion thereupon, and, as a consequence thereof, it is possible to further enlarge the surface area of the attachment of the column bracket upon the forward side with respect to the forward facing incline surface portion, and thereby to improve the rigidity of a joint component of the column bracket upon the forward side. Doing so facilitates effecting the reduction of the weight thereof, as well as the reduction in cost thereupon, to further advantage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A structure of a steering support portion, comprising:
a steering support member configured so as to extend in approximately a direction of a width of a vehicle, so as to be capable of connecting right and left panels of the vehicle, and so as to be positioned within an instrument panel;
front and back column brackets configured so as to be attached upon a lower portion of the steering support member; and
a steering column configured so as to extend in approximately a forward and backward direction of the vehicle, and so as to be positioned upon a lower portion of the steering support member;
wherein:
the steering support member is attached at two front and back locations, in a suspension support state, respectively, to front and back fastening points that are configured so as to be provided respectively upon the front and back column brackets; and
the steering support member includes an approximately triangular cross-section surface, which is configured to be formed by including a horizontal upper surface portion upon an upper surface thereof, which is configured so as to be approximately parallel with both the front and back direction and a width direction of the vehicle, a front incline surface portion upon a lower portion of the horizontal upper surface portion thereof, whereupon the front column bracket is attached, and a rear incline surface portion upon the lower portion of the horizontal upper surface portion thereof, whereupon the back column bracket is attached.

2. The structure of the steering support portion according to claim 1, wherein:

a distance of the direction of the length of the vehicle, from a fulcrum of a twisting motion of the steering support member, which has the triangular cross-section shape, to the fastening point upon the forward side of the column bracket upon the forward side, is set so as to be longer than a distance of the direction of the length of the vehicle, from the fulcrum of the twisting motion to the fastening point upon the rear side of the column bracket upon the rear side.

3. The structure of the steering support portion according to claim 1, wherein:

in addition to connecting the column bracket upon the forward side and a passenger compartment front panel with a post bracket lower material, the post bracket lower material is set in an extended state in a direction that is approximately parallel to a direction of a tangent line, at the fastening point upon the forward side, of a circle, a center whereof is configured to be the fulcrum of the twisting motion of the steering support member, which has the triangular cross-section shape.

4. The structure of the steering support portion according to claim 2, wherein:

in addition to connecting the column bracket upon the forward side and a passenger compartment front panel with a post bracket lower material, the post bracket lower material is set in an extended state in a direction that is approximately parallel to a direction of a tangent line, at the fastening point upon the forward side, of a circle, a center whereof is presumed to be a center of the twisting motion of the steering support member, which has the triangular cross-section shape.

5. The structure of the steering support portion according to claim 1, wherein:

a total region anchoring portion is caused to be attached by being brought into contact upon a totality of a region of an incline surface length, which is in between the column bracket upon the forward side and the forward facing incline surface portion of the steering support member, having the triangular cross-section shape.

6. The structure of the steering support portion according to claim 5, wherein:

an incline surface length of the forward facing incline surface portion of the steering support member, further comprising the triangular cross-section shape, is set so as to become greater than an incline surface length of the rear facing incline surface portion.

* * * * *